United States Patent [19]

Richards

[11] 4,211,249
[45] Jul. 8, 1980

[54] LIQUID LEVEL CONTROL SYSTEM

[75] Inventor: George B. Richards, Lake Forest, Ill.

[73] Assignee: Fluid Device Corporation, Highland Park, Ill.

[21] Appl. No.: 940,067

[22] Filed: Sep. 7, 1978

[51] Int. Cl.² ............................................. F16K 21/18
[52] U.S. Cl. ..................................... 137/393; 4/508; 73/290 R; 137/842; 210/169
[58] Field of Search ............... 137/187, 386, 393, 842, 137/389; 210/169; 73/290, 548; 4/172

[56] References Cited

U.S. PATENT DOCUMENTS

| | | | |
|---|---|---|---|
| 2,739,939 | 3/1956 | Leslie | 210/169 |
| 2,809,752 | 10/1957 | Leslie | 210/169 |
| 3,021,861 | 2/1962 | Billeter et al. | 137/192 |
| 3,174,503 | 3/1965 | Absolon | 137/393 |
| 3,230,965 | 1/1966 | Richards | 137/202 |
| 3,269,404 | 8/1966 | Lebow | 137/393 |
| 3,495,253 | 2/1970 | Richards | 137/822 |
| 3,503,410 | 3/1970 | Richards | 137/829 |
| 3,532,217 | 10/1970 | Richards | 210/169 |
| 3,561,465 | 2/1971 | deGraaf | 137/386 |
| 3,602,250 | 8/1971 | Neenan | 137/386 |
| 3,703,907 | 11/1972 | Richards | 137/386 |
| 3,730,500 | 5/1973 | Richards | 261/140 |
| 3,788,090 | 1/1974 | Richards | 62/139 |
| 4,024,887 | 5/1977 | McGregor | 137/386 |
| 4,148,334 | 4/1979 | Richards | 137/393 |

Primary Examiner—Irwin C. Cohen
Assistant Examiner—G. L. Walton
Attorney, Agent, or Firm—Hosier, Niro & Daleiden, Ltd.

[57] ABSTRACT

A liquid level control system is disclosed for use with a swimming pool or the like having a pool reservoir, a main drain or outlet, usually at the bottom of the reservoir, and an outlet located at a predetermined water maintenance level for the pool. The system includes fluid amplifier means positioned relative to the pool reservoir for sensing an interface between liquid and gas, or water and air, at the surface of the water in the pool and developing a fluid pressure signal when the interface falls below a predetermined level. Liquid circulation means, including a skimmer at the surface of the water in the pool reservoir is provided for circulating water from the pool reservoir between the outlet and an inlet. A portion of the water circulated by the circulation means is channeled to the fluid amplifier means for operating the same. Fluid valve means is provided which is responsive to the fluid pressure signal developed by the fluid amplifier means. The system further includes water supply means for adding water to the pool from an external supply thereof when the fluid valve means senses the fluid pressure signal developed by the fluid amplifier means.

19 Claims, 5 Drawing Figures

U.S. Patent  Jul. 8, 1980  Sheet 1 of 2  4,211,249
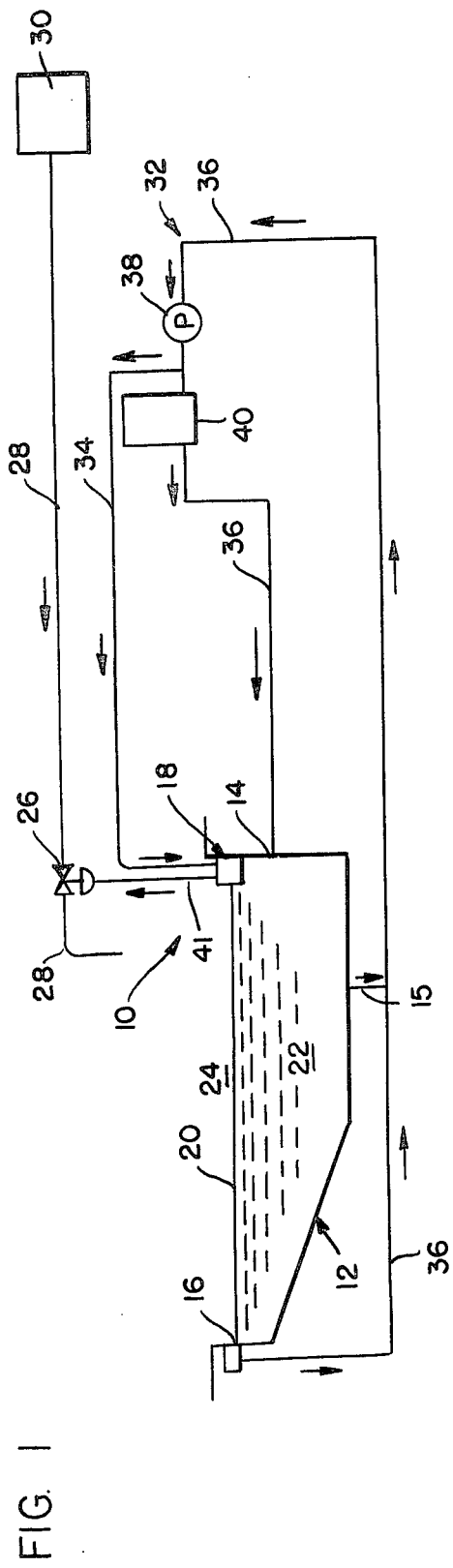
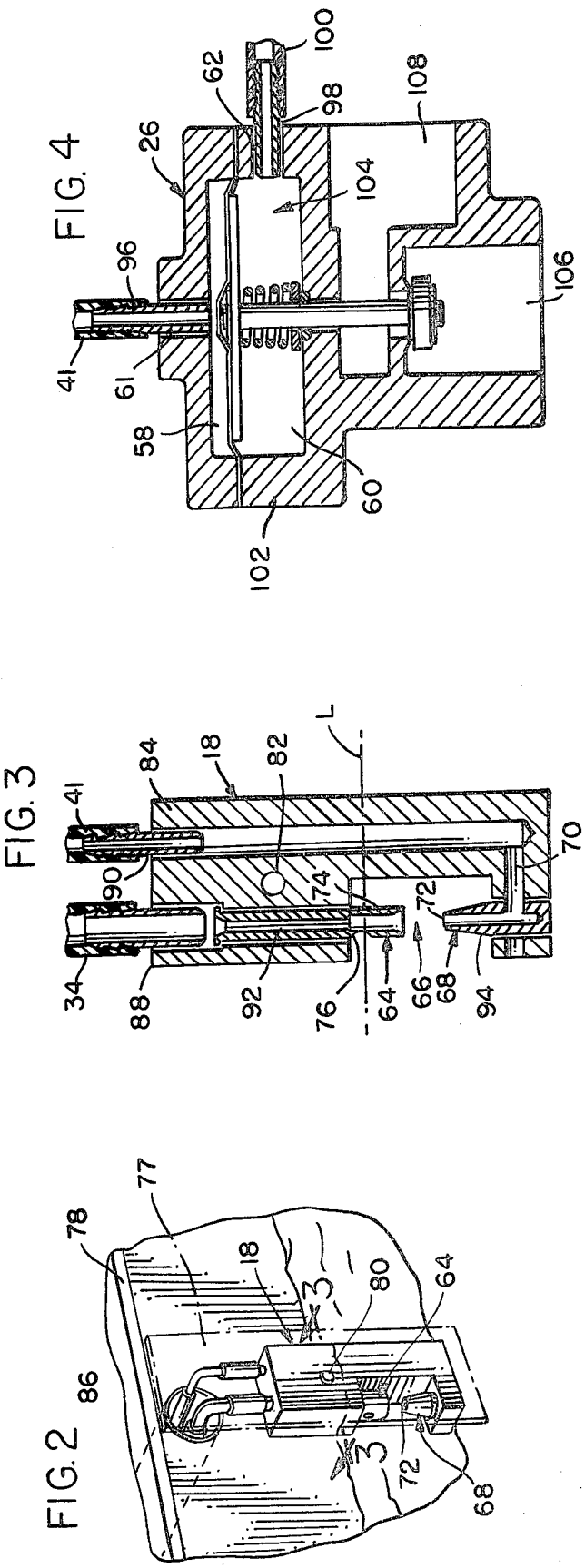

LIQUID LEVEL CONTROL SYSTEM

BACKGROUND AND SUMMARY OF THE INVENTION

The present invention relates to a liquid level control system for swimming pools or the like and, more particularly, to a liquid level control system for use with a liquid or pool reservoir having an inlet, a main drain or outlet usually at the bottom of the pool, and having outlets located at a predetermined liquid maintenance level in the reservoir such as the surface of the water in the pool.

For many applications requiring the use of a liquid reservoir, it is desirable to maintain the reservoir at or near a predetermined liquid maintenance level. This is not so much of a problem where significant fluctuations in the level of the liquid in the reservoir are desirable or at least can be tolerated without adverse impact upon the intended use. It will be appreciated, of course, that one example of this type of reservoir is a household water system which may utilize the pressure within a storage tank to signal a pump and/or valves to control the liquid level. The sensed or controlling level in the storage tank itself may not be of such significance as long as the water pressure and an adequate supply of water throughout the house is maintained. This can be a severe problem, however, where significant fluctuations in the level of the liquid cannot be tolerated or at least are undesirable due to the potential adverse impact upon the intended use. Where the liquid reservoir should be maintained at or near a predetermined liquid maintenance level, it is desirable to be able to automatically refill the reservoir to the predetermined level to immediately replace even small quantities of liquid lost due to evaporation or any other cause. Such a problem is critical in maintaining proper levels in swimming pools or the like. For instance, a skimmer may be employed with a swimming pool for skimming water from the pool reservoir at the surface of the pool and circulating the skimmed water through a filtration system and returning filtered water back to the pool. The cost, size and operation of the skimmer is dependent upon the water level of the pool being maintained at all times at or near a predetermined level. It is essential to have a uniform "cut" of pool water over the weir of the skimmer. This is because the bacteria count is highest at the water surface. Thus, much cleaner water will be obtained if the circulating water through the filter is taken from the outlet at the water level at the surface of the water than at the main drain outlet. In addition, if the water level falls below the skimmer weir and sufficient air is drawn into the circulation system, the pump will lose its prime and frequently the seals will become destroyed because of heat. There are other reasons for maintaining the water level substantially constant at all times during use.

This invention is directed to a liquid level control system for use with a swimming pool or like liquid reservoir for purposes described above. Means are positioned relative to the surface of the water in the pool reservoir for sensing an interface between liquid and gas, or water and air with the interface sensing means producing a signal when the interface falls below a predetermined level. Means responsive to the signal produced by the interface sensing means are provided with the signal responsive means moving to an operative position when the signal is produced by the interface sensing means. Means associated with the signal responsive means are provided for supplying water from an external supply to the pool reservoir permitting water to flow into the pool reservoir when the signal responsive means is moved to the operative position. With these features of construction, the liquid level control system is well suited for maintaining a pool reservoir at a predetermined liquid maintenance level.

Additional details of the liquid level control system include the interface sensing means being a fluid amplifier and the signal produced by the fluid amplifier being a fluid pressure signal. It is also contemplated that the signal responsive means will be a fluid valve and the operative position of the fluid valve will, of course, be an open position. Further, the water is carried by the pipe or conduit from the external water supply to the pool reservoir.

Considering the invention in greater detail, the liquid level control system is well adapted for use with a pool reservoir having an inlet and an outlet as well as means including a water surface skimmer at the outlet for circulating water between the outlet and the inlet. Means associated with the fluid amplifier also is provided for communication of the fluid amplifier with the water circulation means. The system further includes means associated with the fluid valve for communication of the fluid valve with the external water supply so as to permit water to flow into the pool reservoir only when a signal is developed by the fluid amplifier.

Still further details of the present invention include the water circulation means being a circulation conduit for carrying the water from the outlet to the inlet. The water circulation means also includes a pump operatively associated with the circulation conduit for circulating the water from the outlet to the inlet. It is further contemplated that the communication means joining the fluid amplifier and the water circulation means will be a tube leading from the circulation conduit to the fluid amplifier. The tube is preferably joined to the circulation conduit through the tube at a position upstream of the inlet and downstream of the pump. Additionally, the fluid amplifier continuously receives a portion of the water from the circulation conduit through the tube to develop the fluid pressure signal whenever the pool reservoir drops below the predetermined maintenance level.

Other details include the liquid communication means being a supply conduit leading from the external water supply to the pool reservoir. The fluid valve is then advantageously disposed within the supply conduit at a position intermediate the external water supply and the pool reservoir. With these features of construction, the fluid valve can control the flow of water from the external water supply into the pool reservoir thereby controlling and maintaining the pool reservoir at the predetermined maintenance level.

In an alternative embodiment, the liquid level control system is still adapted for use with a pool reservoir having an inlet and having an outlet located at the predetermined water maintenance level of the pool. It includes means at the inlet for restricting flow of the water including a restrictive orifice through which the liquid passes from the circulation conduit into the pool reservoir. A first tube also is provided through which the fluid amplifier communicates with the water in the circulation conduit adjacent the flow restriction means and a second tube is provided, as well through which the fluid pressure signal is transmitted from the fluid amplifier to the fluid valve. It further includes water supply means for adding water to the pool reservoir from an external water supply including a supply conduit with the fluid valve being disposed within the supply conduit.

Still additional details of the alternative embodiment include the fluid amplifier continuously receiving a portion of the water in the circulation conduit through the first tube to develop a fluid pressure signal. The flow restriction means preferably includes a cap associated with the circulation conduit at the inlet with the restrictive orifice in the cap causing an increased pressure in the water in the circulation conduit adjacent the inlet. The cap includes first and second taps extending therethrough with the first tube communicating with the water in the circulation conduit through the first tap and the second tube transmitting the fluid pressure signal to the fluid valve through the second tap. The first tap advantageously is larger than the second tap, with the first tube extending from the fluid amplifier into the first tap and the second tube extending from the fluid amplifier to the fluid valve passing through the second tap and the circulation conduit. Additionally, the fluid valve may suitably be a diaphragm valve having first and second chambers with one of the chambers communicating with the fluid amplifier through the second tube and the other of the chambers communicating with atmospheric pressure.

A significant advantage of the present invention is that it may be provided in kit form for addition to already installed swimming pools. The liquid level control kit will include a fluid amplifier, a fluid valve, a cap, a first tube, and a second tube. The fluid amplifier will be made of a type for positioning relative to the surface of the water in the swimming poll for developing a fluid pressure signal when an interface between liquid and gas at the water surface falls below a predetermined level. The fluid valve will be of a type responding to the fluid pressure signal developed by the fluid amplifier by opening in the presence of the signal and closing in the absence of the signal. The cap will be of a type which may be secured to a water circulation pipe at an inlet to the pool reservoir and it will have a restrictive orifice extending therethrough and also will include first and second taps extending therethrough. The first tube will be of a type for joining the fluid amplifier to the first tap in the cap for communication of the fluid amplifier with the circulating water in the pipe for developing the fluid pressure signal. The second tube will be of a type for joining the fluid amplifier to the fluid valve by passing through the second tap and the pipe for transmitting the fluid pressure signal to the fluid valve. With these features of construction, the fluid valve may be disposed within a supply line leading from an external water supply to the reservoir and the supply line may thereafter by automatically controlled by the fluid valve to maintain a predetermined water level within the pool reservoir.

The present invention is therefore directed to a liquid level control system for use with a swimming pool reservoir having an inlet and having an outlet located at a predetermined water maintenance level in the pool. It is further directed to such a liquid level control system in kit form for use with a previously installed swimming pool of the type described. Still other objects and advantages of the present invention will be appreciated from the details of construction and operation set forth in the accompanying specification, claims and drawings.

BRIEF DESCRIPTION OF THE DRAWINGS

The features of the present invention which are believed to be novel are set forth with particularlity in the appended claims. The invention, together with the further objects and advantages thereof may best be understood by reference to the following description taken in conjunction with the accompanying drawings. In the drawings, like reference numerals identify like elements in the several figures, in which:

FIG. 1 is a schematic view of the liquid level control system of the present invention being used with a swimming pool reservoir having an inlet and having an outlet located at a predetermined water maintenance level in the pool reservoir;

FIG. 2 is a fragmented perspective view of a fluid amplifier positioned relative to the pool reservoir for sensing an interface between liquid and gas at the water surface so as to produce a signal when the interface falls below a predetermined level;

FIG. 3 is a sectional view, on an enlarged scale, of the fluid amplifier taken generally along line 3—3 of FIG. 2;

FIG. 4 is a sectional view of a fluid valve responsive to the fluid pressure signal developed by the fluid amplifier so as to open in the presence of the fluid pressure signal and close in the absence of the signal.

DETAILED DESCRIPTION OF THE PREFERRED EMBODIMENT

Figure 5:
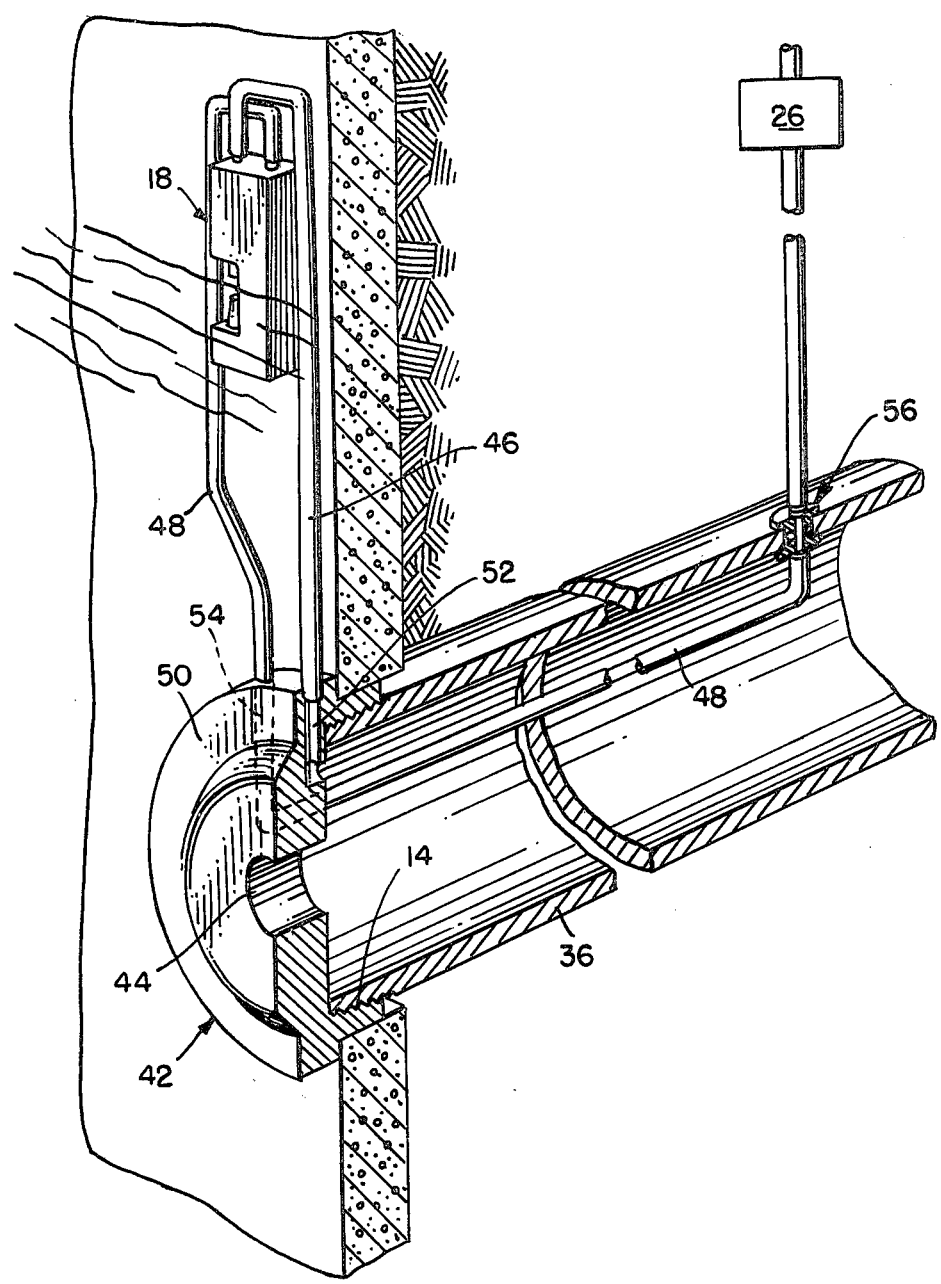
FIG. 5 is a fragmented perspective view, partially in section, illustrating certain components of the liquid level control system in kit form for use with a swimming pool reservoir having an inlet and having an outlet located at a predetermined water maintenance level in the pool.

In the illustration given and with reference first to FIG. 1, the numeral 10 designates generally a liquid level control system for use with a liquid reservoir or swimming pool 12 having an inlet 14, a main drain or outlet 15 at the bottom of the pool reservoir, and an outlet 16 located at a predetermined water maintenance level in the pool 12. The outlet 16 includes a skimmer for skimming water and any debris from the surface of the water in the pool reservoir 12. The system 10 includes means 18 positioned relative to the pool 12 for sensing an interface 20 between liquid (water, as at 22) and gas (air, as at 24) with the interface sensing means 18 producing a signal when the interface 20 falls below a predetermined level. Means 26 responsive to the signal produced by the interface sensing means 18 also is provided. The signal responsive means 26 moves to an operative position when the signal is produced by the interface sensing means 18. The system 10 also includes means 28 associated with the signal responsive means 26 for supplying water from an external water supply 30 to the pool 12 with the water supply means 28 permitting water to flow into the pool 12 when the signal responsive means 26 is moved to the operative position. This make up water, for instance, for aesthetic reasons, can be injected into the circulating system at a selected point therealong, such as the chlorinating line, rather than adding the water directly into the pool reservoir. With these features of construction, the liquid level control system 10 is well adapted for maintaining the swimming pool 12 at a predetermined water maintenance level as will become more apparent hereinafter.

Referring to FIGS. 2 and 3, the interface sensing means 18 preferably is a fluid amplifier with the signal produced thereby being a fluid pressure signal. The signal responsive means 26 (as illustrated in FIG. 4) is preferably a fluid valve with the operative position being an open position. Additionally, the water supply means 28 is a conduit or pipe with the flowing water being carried by the conduit from the external water supply 30 to the pool 12 as shown in FIG. 1.

Considering the liquid level control system 10 in greater detail, it also includes means 32 for circulating water between the outlet 16 and the inlet 14 of the pool 12 as well as means 34 associated with the fluid amplifier 18 for communication with the fluid amplifier 18 with the water circulation means 32. Additionally, the liquid level control system 10 includes the fluid valve 26 being disposed in the conduit or pipe 28 intermediate the pool 12 and the external water supply 30 such that water from the external water supply 30 is permitted to flow into the pool 12 when a fluid pressure signal is developed by the fluid amplifier 18 and sensed by the fluid valve 26.

The water circulation means 32 includes a circulation conduit 36 for carrying the water from the pool 12 between the outlet 16 and the inlet 14. It also includes a pump 38 operatively associated with the circulation conduit 36 for circulating the water from the pool 12 between the outlet 16 and the inlet 14. The main drain or outlet 15 at the bottom of the pool reservoir is connected to the conduit 36. The communication means 34 joining the fluid amplifier 18 to the water circulation means 32 includes a tube leading from the circulation conduit 36 to the fluid amplifier 18. It continuously carries a portion of the water from the circulation conduit 36 to the fluid amplifier 18 to develop the signal. Preferably, the fluid amplifier 18 is joined to the circulation conduit 36 through the tube 34 at a position upstream of the inlet 14, upstream of a chlorinator and filter 40, and downstream of the pump 38. The fluid amplifier may be located at any point in the circulation system downstream of the pump 38 but before the circulating water is returned to the pool, such as downstream of the filter 40.

As previously noted, the communication means 28 joining the fluid valve 26 and the external water supply 30 includes a conduit or pipe leading from the external water supply 30 to the pool 12 with the fluid valve 26 being disposed within the conduit or pipe 28 at a position intermediate the external water supply 30 and the pool 12. It will also be appreciated from FIG. 1 that a tube 41 is provided for transmitting fluid pressure signals from the fluid amplifier 18 to the fluid valve 26. While the fluid valve 26 can be of a conventional type, the only essential criteria is that it be movable between an operative or open position in the presence of a fluid pressure signal from the fluid amplifier 18 and an inoperative or closed position in the absence of a fluid pressure signal from the fluid amplifier 18.

Considering the liquid level control system 10 in still greater detail, the fluid amplifier 18 is positioned relative to the pool 12 for sensing the interface 20 between water and air at the surface of the water in the pool such that the fluid amplifier 18 develops a fluid pressure signal when the interface 20 falls below a predetermined water level. It also is contemplated as an alternative embodiment that means, generally designated 42, (as shown in FIG. 5) can be provided for restricting flow of the water in the circulation conduit 36 at the inlet 14. The flow restriction means 42 includes a restrictive orifice 44 through which the water passes from the circulation conduit 36 into the pool 12. It is further contemplated in the alternative embodiment that a first tube 46 will be provided through which the fluid amplifier 18 can communicate with the water in the circulation conduit 36 adjacent the flow restriction means 42 and a second tube 48 will be provided through which the fluid pressure signal can be transmitted from the fluid amplifier 18 to the fluid valve 26. With these features of construction, the liquid level control system 10 can advantageously be provided either as a part of an original installation or in kit form for addition to any pre-existing pool 12.

As shown in FIG. 5, the fluid amplifier 18 will continuously receive a portion of the water in the circulation conduit 36 through the first tube 46 to develop the fluid pressure signal. The flow restriction means 42 includes a cap 50 associated with the circulation conduit 36 at the inlet 14 with the restrictive orifice 44 causing an increased pressure in the liquid in the circulation conduit 36 adjacent the inlet 14. The cap 50 includes first and second taps 52 and 54 extending therethrough with the first tube 46 communicating with the water in the circulation conduit 36 through the first tap 52 and the second tube 48 transmitting the fluid pressure signal to the fluid valve 26 through the second tap 54. The first tap 52 is larger than the second tap 54 and the second tube 48 extends from the fluid amplifier 18 to the fluid valve 26 passing through the second tap 54 and the circulation conduit 36 as at 56. Additionally, the fluid valve 26 is advantageously a diaphragm valve (as shown in FIG. 4) having first and second chambers 58 and 60 with one of the chambers 58 communicating with the fluid amplifier 18 through an opening 61 and the other of the chamber 60 communicating through an opening 62 with atmospheric pressure.

With the above features of construction, the liquid level control system 10 can easily be manufactured and sold as a kit for use with a pre-existing pool 12 having an inlet 14 and having an outlet 16 joined by a pipe or conduit 36 for circulating liquid or water between the outlet 16 and the inlet 14. The kit will include the fluid amplifier 18 for positioning relative to the pool 12 so as to develop a fluid pressure signal when the interface 20 between water and air falls below a predetermined level. It also will include the fluid valve 26 which will respond to the fluid pressure signal developed by the fluid amplifier 18 by opening in the presence of the signal and closing in the absence of the signal. The kit will also include the cap 50 which can be secured to the pipe at the inlet 14 with the cap 50 having a restrictive orifice 44 extending therethrough together with first and second taps 52 and 54. It also will include a first tap 52 which can join the fluid amplifier 18 to the cap 50 for communication of the fluid amplifier 18 with the circulating water in the pipe 36 to develop the fluid pressure signal. The kit will further include the second tube 48 for joining the fluid amplifier 18 to the fluid valve 26 by passing through the second tap 54 and the pipe or conduit 36 for transmitting the fluid pressure signal to the fluid valve 26. With these components, the liquid level control kit may successfully be utilized by disposing the fluid valve 26 with a supply line (such as at 28 in FIG. 1) leading from an external water supply 30 to the pool 12 and the supply line 28 may thereafter be automatically controlled by the fluid valve 26 to maintain a predetermined water level within the pool 12.

Referring again to FIGS. 2 and 3, the fluid amplifier 18 can be better understood. It includes aligned inlet, interaction, and outlet zones, respectively, comprising an inlet means 64, a free space 66 and an outlet means 68, the free space 66 separating the inlet 64 and the outlet 68. As seen in the drawings, the outlet means 68 is formed from a pair of hollow conduit sections positioned in adjacent parallel relationship with a hollow connector 70 joining the two sections to provide a liquid flow path from a receiving orifice 72 of the outlet means 68 to the second or outlet tube 41. It will also be appreciated that the inlet means 64 is similarly formed from a hollow conduit section with one end cooperating with the first or inlet tube 34 and the other end forming a discharge orifice 74. As will be seen, the discharge orifice 74 is restricted in cross-section relative to the upstream portion of the inlet means 64 for directing the exit flow across the free space of the interaction region 66 toward, and axially aligned with, the receiving orifice 72 of the outlet means 68.

With such a fluid amplifier 18, the water in the first or inlet tube 34 is continuously flowing downwardly out of the discharge orifice 74 of the inlet means 64. Fluid pressure is created by this downward flow of water and is sensed at the outlet means 68 which transmits a fluid pressure signal to the fluid valve 26 to supply water to the pool reservoir as long as the fluid pressure is sensed. However, when the water level rises above a sensing level L, the pressure in the outlet means 68 drops to zero and no fluid pressure signal is transmitted through the second or outlet tube 41 to the fluid valve 26. The sensing level L is generally in line with a side orifice 76 in the inlet means 64. This sensing level L in relation to the side orifice 76 is fully described in my earlier U.S. Pat. No. 3,703,907, which is incorporated herein by reference.

As can be seen from FIGS. 2 and 3, the fluid amplifier 18 may be secured to a plate 77 mounted to the wall 78 of the pool 12 by means of a fastener 80. The fastener 80 may extend through a bore 82 in the body 84 of the fluid amplifier 18. The fluid amplifier 18 may then easily be adjustably positioned within the pool 12 by moving the fluid amplifier 18 vertically upward or downward. The sensing level L will, of course, be directly affected by the vertical placement of the fluid amplifier 18 on the plate 77. Still additional details of the fluid amplifier 18 may be readily perceived and understood by considering my earlier U.S. Pat. No. 3,703,907 which is incorporated herein by reference.

As shown in FIG. 2, the first and second tubes 34 and 41 may extend through a conduit 86. This arrangement would be best suited for new construction of a pool 12 in contrast to the arrangement illustrated in FIG. 5. The latter arrangement is best suited for use in kit form for pre-existing pools so as to require a minimum of modification to the components already in place. It will be understood by those skilled in the art, however, that the principles of operation of the liquid level control system of the present invention are common to both arrangements. Accordingly, the specific details of construction are unimportant so long as the principles of operation are followed.

Preferably, the body 84 of the fluid amplifier 18 is constructed of molded polyvinylchloride. A pair of barbed connectors 88 and 90, respectively, mounted in the conduit sections of the inlet conduit 64 and the outlet conduit 68 in interference fit fashion may suitably be constructed of stainless steel tubing. The barbed connectors 88 and 90 are well suited for joining the first or inlet conduit 34 and the second or outlet conduit 41, respectively, to the fluid amplifier 18 where the conduits 34 and 41 are constructed of plastic. An insert 92 as well as an insert 94 may form the discharge orifice 74 and the receiving orifice 72 both of which may suitably be formed of molded "Delrin". While those materials and configurations have been found desirable for the fluid amplifier 18, it will readily be understood and appreciated by those skilled in the art that other materials and configurations may be employed without departing from the spirit and scope of the invention.

Referring to FIG. 4, the fluid pressure signal is transmitted from the fluid amplifier 18 to the fluid valve 26 through the second or outlet conduit 41. The second conduit 41 communicates with the first chamber 58 through a barbed fitting 96. The second chamber 60 communicates with atmospheric pressure through a barbed fitting 98. The fluid valve 26 may occasionally be buried in the soil in which case tubing 100 may be secured to the barbed fitting 98 extending above grade so that dirt cannot enter the fluid valve 26. Additionally, the tubing 100 will serve as a means of detecting leakage in the fluid valve 26 without the necessity of actually inspecting the fluid valve 26 when it is buried in the soil.

Once again, the body 102 of the fluid valve 26 may be formed of molded polyvinylchloride. The barbed connectors 96 and 98 may again be constructed of stainless steel and be confined in the openings 61 and 62, respectively, in interference fit fashion. Of course, the fluid valve 26 will include a spring loaded diaphragm plunger assembly 104 of a type which will be understood by those skilled in the art.

As shown, the fluid valve 26 will include an inlet port 106 to receive water from an external water supply and an outlet port 108 to supply water to the pool 12. The precise fittings for joining conduit to the inlet port 106 and the outlet port 108 have not been shown. It is believed that such fittings, which may, for instance, be threaded fittings, are well known and appreciated by those skilled in the art requiring no discussion herein. The fluid valve 26 is, of course, sealed to prevent any leakage. Furthermore, the fluid valve 26 opens only in the presence of a fluid pressure signal being transmitted through the first or inlet tube 41 and closes in the absence of such a signal.

Referring again to FIG. 1, the use and operation of the liquid level control system 10 with the swimming pool 12, the circulation system thereof can be understood. The outlet 16, set at a predetermined water maintenance level, comprises or is part of a surface level skimmer. The skimmer 16 continuously directs overflow water from the swimming pool into the circulation conduit 36. The pump 38 forces the water in the circulation conduit 36 out the inlet 14. With these features of construction, the skimmer 16, circulation conduit 36, pump 38 and inlet 14 define means for providing continuous circulation of water from the swimming pool 12, through the chlorinator and filter 40, and back into the swimming pool 12.

As previously discussed, the first or inlet tube 34 leads from the circulation conduit 36 to the fluid amplifier 18. The fluid amplifier 18 continuously receives a portion of the water from the circulation conduit 36 through the tube 34 to develop a fluid pressure signal whenever the interface 20 between water and air falls below a predetermined water maintenance level L. This will normally occur when the interface 20 drops below the side orifice 76 in the inlet means 64 in accordance with the teachings of my earlier U.S. Pat. No. 3,703,907. The fluid pressure signal will then be carried through the second or outlet tube 41 to the fluid valve 26 where it will depress the spring loaded diaphragm plunger assembly 104. When this occurs, the fluid valve 26 will be opened, meaning that water from the external water supply 30 will be carried through the supply conduit 28, through the inlet port 106, out the outlet port 108, again through the supply conduit 28, into the swimming pool 12.

After the fluid valve 26 has been opened, it will not close until the fluid pressure signal no longer exists which will not occur until the interface 20 between water and air once again reaches the sensing level L. It will therefore be seen that the fluctuation in the water level in the swimming pool 12 can be maintained at a minimum. Accordingly, the liquid level control system 10 is particularly well suited for use with the swimming pool 12 which continuously skims the surface of the water.

Referring once again to the alternative embodiment of FIG. 5, the circulating conduit 36 may suitably be a standard 1½ or 2 inch filtered pool water pipe. The rate of flow through the pipe 36 may, for example, be in the range of 70 to 100 gallons per minute. The restrictive orifice 44 in the cap 50 can be in the range of ⅜ to ¾ inch which will result in a pressure on the upstream side of the orifice 44 on the order of 5 p.s.i. plus or minus 1 p.s.i. With this arrangement, the first or inlet tube 46 will be able to continuously carry a sufficient flow of water to the fluid amplifier 18 to produce a signal when the interface 20 drops below the opening to the receiving orifice 72.

By way of example, the first or inlet tube 46 can be ⅜" outer diameter tubing with the tap having an identical inner diameter. The second or outlet tube 48 can be ¼" inner diameter tubing similarly passed through the tap 54 which is suitably dimensioned for this purpose. With these dimensions, it has been found that a fluid pressure signal may be carried 15 to 20 feet to a convenient point where the second or outlet tube 48 can be attached to the fluid valve 26.

As shown, the second or outlet tube 48 passes through the wall of the supply conduit or pipe 36. A fitting as shown at 56 can be provided to seal the hole through which the second or outlet tube 48 passes. It will be appreciated that the fitting should be of a type providing a water-tight seal to prevent leakage of water from the pipe 36 around the tube 48 while at the same time permitting the fluid pressure signal to be transmitted therethrough. The details of the fitting as shown at 56 are unimportant for purposes of understanding the inventive concepts. Accordingly, the fitting will not be discussed in any detail herein.

Among the advantages of the embodiment of the liquid level control system illustrated in FIG. 5 is the fact that the system can be provided in kit form for use with a swimming pool to maintain the water at a predetermined level. It will be appreciated that this is possible in part because the restrictive orifice 44 furnishes a convenient means of raising the pressure at the inlet 14 for providing a continuous flow of water through the first or inlet conduit 46. The continuous flow of water not only provides an adequate pressure to feed the fluid amplifier 18, but also provides a reasonably uniform pressure as well. It will also be appreciated that the liquid level control system 10 does not disturb or detract from the decor of the swimming pool. Further, any mechanic or owner can install the kit form of the liquid level control system with a minimum of tools in a simple, quick and reliable fashion.

Accordingly, the present invention accomplishes the objective of providing means for automatically refilling a swimming pool and immediately replacing water lost due to evaporation or any other cause. The system requires absolutely no electricity, has no moving parts in the fluid amplifier, and is easy to install. As water is returned to the swimming pool, a small amount of it is diverted to a small tube which carries the water directly to the fluid amplifier to provide the power needed for effective operation of the fluid amplifier.

When the water level of the pool is low, the diverted water passes through the fluid amplifier to produce a fluid pressure signal which is carried through a tube to the fluid valve which is then opened by the pressure. As the fluid valve opens, fresh water from an external source flows into the pool until the water level again rises beyond the sensing level.

As stated above, the fluid amplifier 18 can be located at any point in the circulation system downstream from the pump 38 but before the water is returned to the pool reservoir. Thus, the fluid amplifier can be placed at the restriction at the inlet 14 as shown in FIG. 5 or it could be located one foot or ten or more feet from the pool, as long as it is located downstream of the pump and a pressure or power loss on the order of 2 p.s.i. can be created and utilized.

While in the foregoing specification, a detailed description of the invention has been set forth for purposes of illustration, the details herein given may be varied by those skilled in the art without departing from the spirit and scope of the invention as defined by the appended claims.

I claim:

1. A liquid level control system for use with a swimming pool or the like, comprising:
 a pool reservoir;
 outlet means from the pool reservoir;
 inlet means to the pool reservoir;
 water circulation means between said outlet means and said inlet means;
 means including a fluid amplifier positioned relative to said pool reservoir in communication with said water circulation means for sensing an interface between liquid and gas at the surface level of water in said pool reservoir, said interface sensing means producing a fluid pressure signal when said interface falls below a predetermined water level;
 means including a fluid valve which is responsive to said signal produced by said interface sensing means, said signal responsive means being normally closed in an inoperative position and movable to an operative open position when said fluid pressure signal is produced by said interface sensing means; and
 means associated with said signal responsive means for supplying water from an external water supply to said reservoir when said signal responsive means is moved to said operative position.

2. The system as defined in claim 1 in which said water supply means is a conduit for carrying water from said external water supply to said pool reservoir and said fluid valve is disposed in said conduit.

3. The system as defined in claim 1 in which said water circulation means includes a circulation conduit for carrying said liquid from said outlet to said inlet.

4. The system as defined in claim 3 in which said water circulation means includes a pump operatively associated with said circulation conduit for circulating said liquid from said outlet to said inlet.

5. The system as defined in claim 1 in which said communication means joining said interface sensing means and said water circulation means includes a tube leading from water circulation means to said interface sensing means.

6. The system as defined in claim 5 in which said interface sensing means continuously receives a portion of said water from said circulation means through said tube to develop said signal.

7. The system as defined in claim 6 in which said interface sensing means is joined to said circulation means through said tube at a position upstream of said inlet and downstream of said pump.

8. The system as defined in claim 1 in which said communication means joining said signal responsive means and said external water supply includes a supply conduit leading from said external water supply to said pool reservoir.

9. The system as defined in claim 8 in which said signal responsive means is disposed within said supply conduit at a position intermediate said external water supply and said pool reservoir.

10. The system as defined in claim 1 including means mounting said interface sensing means at said inlet means.

11. The system as defined in claim 1 wherein said outlet means includes a skimmer for skimming water from the surface level of said pool reservoir.

12. The system as defined in claim 1 wherein said water circulation means includes a pump, and a filter is disposed in said circulation means between said pump and said inlet means.

13. A liquid level control system for use with a liquid reservoir having an inlet and having an outlet located at a predetermined liquid maintenance level in said reservoir, comprising:
fluid amplifier means positioned relative to said reservoir for sensing an interface between liquid and gas, said fluid amplifier means developing a fluid pressure signal when said interface falls below said predetermined level;
means in communication with said fluid amplifier means for circulating liquid between said outlet and said inlet, said circulation means including a circulation conduit for carrying said liquid from said outlet to said inlet, and means operatively associated with said circulation conduit for circulating said liquid;
means for restricting flow of said liquid in said circulation conduit at said inlet, said flow restriction means including a restrictive orifice through which said liquid passes from said circulation conduit into said reservoir;
a first tube connected to said fluid amplifier means communicates with said liquid in said circulation conduit adjacent said flow restriction means;
fluid valve means responsive to said fluid pressure signal developed by said fluid amplifier means, said fluid valve means being normally closed in an inoperative position in the absence of said fluid pressure signal and opening in the presence of said fluid pressure signal;
a second tube connected to said fluid amplifier means through which said fluid pressure signal is transmitted from said fluid amplifier means to said fluid valve means; and
liquid supply means for adding liquid to said reservoir from an external liquid supply, said liquid supply means including a supply conduit for carrying said liquid to be added from said external liquid supply to said reservoir, said fluid valve means being disposed within said supply conduit.

14. The system as defined in claim 13 in which said fluid amplifier means continuously receives a portion of said liquid in said circulation conduit through said first tube to develop said fluid pressure signal.

15. The system as defined in claim 13 in which said fluid valve means is a diaphragm valve having first and second chambers with one of said chambers communicating with said fluid amplifier means through said second tube.

16. The system as defined in claim 13 in which said flow restriction means includes a cap associated with said circulation conduit at said inlet, said restrictive orifice causing an increased pressure in said liquid in said circulation conduit adjacent said inlet.

17. The system as defined in claim 16 in which said cap includes first and second taps extending therethrough, said first tube communicating with said liquid in said circulation conduit through said first tap and said second tube transmitting said fluid pressure signal to said fluid valve means through said second tap.

18. The system as defined in claim 17 in which said first tap is larger than said second tap and said second tube extends from said fluid amplifier means to said fluid valve means passing through said second tap and said circulation conduit.

19. A liquid level control kit for use with a liquid reservoir having an inlet and an outlet including a pipe for circulating liquid between said outlet and said inlet, comprising:
a fluid amplifier positioned relative to said reservoir for developing a fluid pressure signal when an interface between liquid and gas falls below a predetermined level;
a fluid valve responsive to said fluid pressure signal developed by said fluid amplifier for opening in the presence of said signal and closing in the absence of said signal;
a cap capable of being secured to said pipe at said inlet, said cap having a restrictive orifice extending therethrough and also including first and second taps extending therethrough;
a first tube capable of joining said fluid amplifier to said first tap in said cap for communication of said fluid amplifier with said circulating liquid in said pipe to develop said fluid pressure signal; and
a second tube capable of joining said fluid amplifier to said fluid valve by passing through said second tap and said pipe for transmitting said fluid pressure signal to said fluid valve;
whereby said fluid valve may be disposed within a supply line leading from an external liquid supply to said reservoir and said supply line may thereafter be automatically controlled by said fluid valve to maintain a predetermined liquid level within said reservoir.

* * * * *